United States Patent
Hanaoka et al.

(10) Patent No.: US 11,418,225 B2
(45) Date of Patent: Aug. 16, 2022

(54) RADIO FREQUENCY MODULE AND COMMUNICATION DEVICE

(71) Applicant: MURATA MANUFACTURING CO., LTD., Nagaokakyo (JP)

(72) Inventors: Kunitoshi Hanaoka, Nagaokakyo (JP); Yoichi Sawada, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 0 days.

(21) Appl. No.: 17/105,657

(22) Filed: Nov. 27, 2020

(65) Prior Publication Data
US 2021/0167803 A1 Jun. 3, 2021

(30) Foreign Application Priority Data

Dec. 3, 2019 (JP) ............................. JP2019-218972
May 25, 2020 (JP) ............................. JP2020-090886

(51) Int. Cl.
*H04B 1/00* (2006.01)
*H04B 1/04* (2006.01)
*H04B 1/10* (2006.01)

(52) U.S. Cl.
CPC ........... *H04B 1/006* (2013.01); *H04B 1/0458* (2013.01); *H04B 1/1036* (2013.01); *H04B 2001/0408* (2013.01)

(58) Field of Classification Search
CPC .... H04B 1/005; H04B 1/0053; H04B 1/0057; H04B 1/006; H04B 1/0067; H04B 1/0075; H04B 1/0078; H04B 1/03; H04B 1/04; H04B 1/0458; H04B 1/0457; H04B 1/0483; H04B 1/1018; H04B 1/1036; H04B 1/44; H04B 1/48; H04B 7/0602; H04B 2001/0408; H04B 2001/0416

USPC ....... 375/219, 220, 222, 259, 260, 262, 265, 375/267, 297, 318; 343/876; 370/277, 370/278, 282; 455/78, 80, 82–84, 88, 455/114.3

See application file for complete search history.

(56) References Cited

U.S. PATENT DOCUMENTS

| | | | | |
|---|---|---|---|---|
| 5,524,283 A | * | 6/1996 | Miyakawa | ............... H04B 1/38 361/752 |
| 8,036,148 B2 | * | 10/2011 | Fukamachi | ............... H04B 1/44 370/282 |
| 9,590,494 B1 | * | 3/2017 | Zhou | .................. H02M 1/4208 |

(Continued)

FOREIGN PATENT DOCUMENTS

| | | |
|---|---|---|
| JP | 2007-19292 A | 1/2007 |
| JP | 2019-176452 A | 10/2019 |
| WO | 2018/168500 A1 | 9/2018 |

OTHER PUBLICATIONS

Office Action dated Dec. 23, 2021, in corresponding Korean patent Application No. 10-2020-0157361, 9 pages.

*Primary Examiner* — Young T. Tse
(74) *Attorney, Agent, or Firm* — Xsensus LLP

(57) ABSTRACT

A radio frequency module includes: a module board including a first principal surface and a second principal surface on opposite sides of the module board; a transmission input terminal; a first transmission amplifier disposed on the first principal surface that amplifies a transmission signal input through the transmission input terminal; and a first switch disposed on the second principal surface that connects and disconnects the transmission input terminal and the first transmission amplifier.

18 Claims, 9 Drawing Sheets

(56) References Cited

U.S. PATENT DOCUMENTS

| | | | |
|---|---|---|---|
| 9,780,735 B1* | 10/2017 | Obiya | H03F 3/195 |
| 2005/0151599 A1* | 7/2005 | Ido | H03H 9/72 |
| | | | 333/133 |
| 2011/0304388 A1* | 12/2011 | Yamawaki | H04B 1/006 |
| | | | 327/557 |
| 2012/0163247 A1* | 6/2012 | Shimamoto | H04B 1/525 |
| | | | 370/278 |
| 2013/0222045 A1* | 8/2013 | Wu | H01L 23/3675 |
| | | | 257/E29.345 |
| 2018/0131501 A1* | 5/2018 | Little | H04B 1/0064 |
| 2018/0226367 A1* | 8/2018 | Babcock | H03F 1/347 |
| 2018/0226928 A1* | 8/2018 | Obiya | H04B 1/18 |
| 2018/0316311 A1* | 11/2018 | Gebeyehu | H03F 1/0227 |
| 2019/0115946 A1* | 4/2019 | Pehlke | H04B 1/04 |
| 2019/0190563 A1 | 6/2019 | Sakurai et al. | |
| 2019/0267339 A1* | 8/2019 | Murase | H04B 1/40 |
| 2020/0007096 A1 | 1/2020 | Kita | |

\* cited by examiner

RADIO FREQUENCY MODULE AND COMMUNICATION DEVICE

CROSS REFERENCE TO RELATED APPLICATIONS

The present application is based on and claims priority to Japanese Patent Application No. 2019-218972 filed on Dec. 3, 2019 and priority to Japanese Patent Application No. 2020-090886 filed on May 25, 2020. The entire disclosure of the above-identified applications, including the specifications, drawings and claims is incorporated herein by reference in its entirety.

TECHNICAL FIELD

The present disclosure relates to a radio frequency (RF) module and a communication device.

BACKGROUND

In mobile communication devices such as a mobile phone, the arrangement configuration of circuit elements included in radio frequency front-end circuits is becoming complex, particularly with developments in multiband technologies.

U.S. Patent Application Publication No. 2018/0131501 discloses a configuration of a front-end circuit including two transmission power amplifiers for executing transmission using a plurality of communication bands (frequency bands). The front-end circuit includes a switch on the input side of two transmission power amplifiers. The switch switches between inputting transmission signals from two transceiver circuits to one of the two transmission power amplifiers and inputting the transmission signals to the other of the two transmission power amplifiers. According to this configuration, two transmission signals output from the above-described two transceiver circuits can be transmitted with high isolation from two antennas via the above-described front-end circuit.

SUMMARY

Technical Problems

However, as recognized by the present inventor, when the front-end circuit disclosed by U.S. Patent Application Publication No. 2018/0131501 is configured in a single module as a small-sized front-end circuit, a signal path on the input side of the transmission power amplifier and a signal path on the output side of the transmission power amplifier are located close to each other, and thus it is expected that the isolation between the two signal paths deteriorates. When the isolation between the signal path on the input side of the transmission power amplifier and the signal path on the output side of the transmission power amplifier deteriorates, a feedback loop of an unnecessary radio frequency signal is formed between the input and the output of the transmission power amplifier. In this case, the transmission power amplifier oscillates under a certain conditions, and there arises a problem that the operation of the transmission power amplifier becomes unstable.

The present disclosure is to address the above-describe problems, and is presented to provide a radio frequency module and a communication device that reduce unstable operations of the transmission power amplifier.

Solutions

In order to provide such a radio frequency module and such a communication device, a radio frequency module according to one aspect of the present disclosure includes: a module board including a first principal surface and a second principal surface on opposite sides of the module board; a transmission input terminal; a first transmission amplifier configured to amplify a transmission signal input through the transmission input terminal; and a switch configured to connect and disconnect the transmission input terminal and the first transmission amplifier. In the above-described radio frequency module, the first transmission amplifier is disposed on the first principal surface, and the switch is disposed on the second principal surface.

Advantageous Effects

According to the present disclosure, it is possible to provide a radio frequency module and a communication device that reduce unstable operations of a transmission power amplifier.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1A:
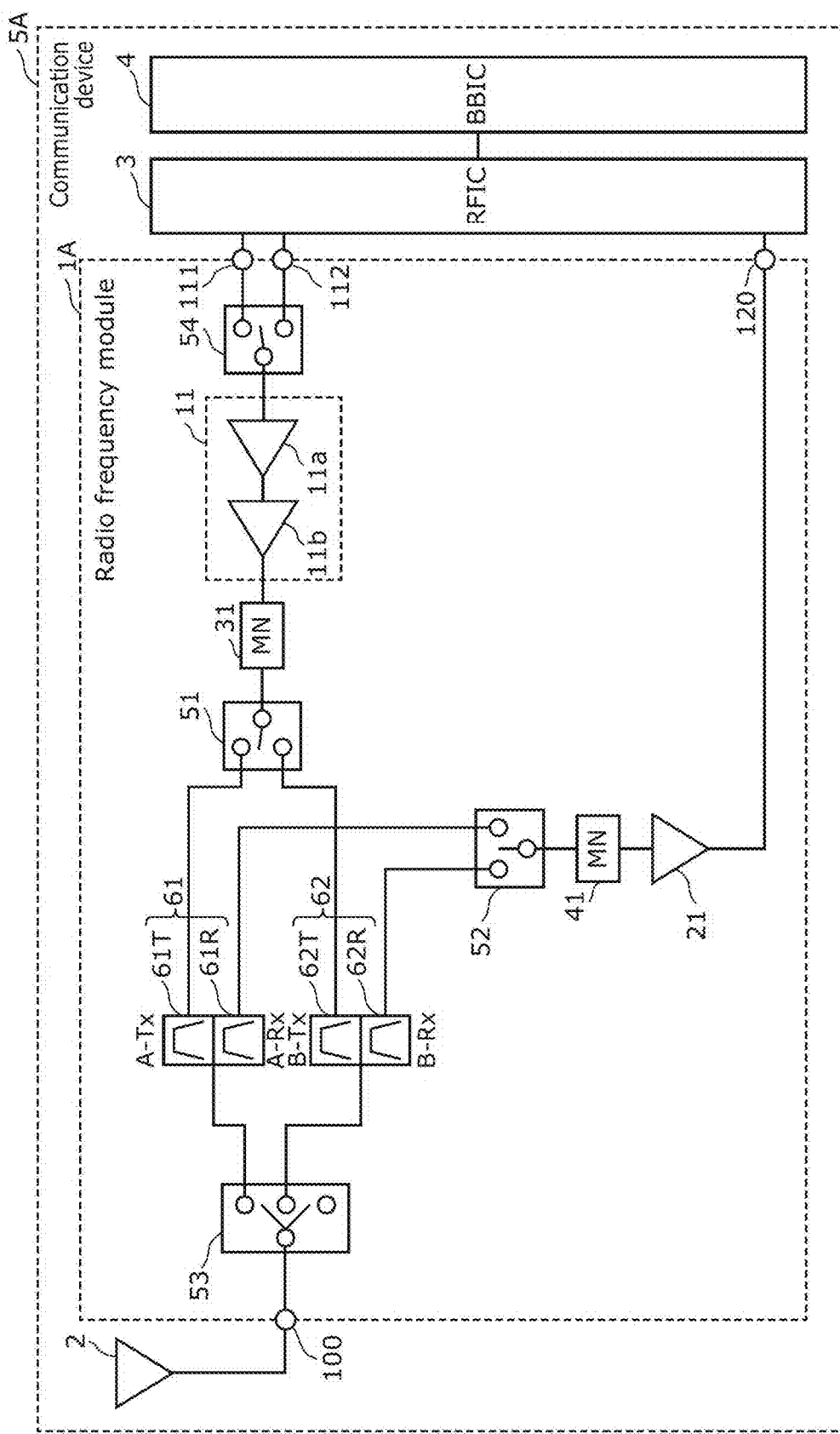
FIG. 1A is a diagram illustrating a circuit configuration of a radio frequency module (or RF front-end circuitry) and a communication device according to an embodiment.

The following describes in detail embodiments of the present disclosure. Each of the embodiments described below illustrates a general or specific example. The numerical values, shapes, materials, structural components, the arrangement and connection of the structural components, and so on, illustrated in the following embodiments, working examples, and variations are mere examples, and therefore do not limit the present disclosure. Among the structural components in the following working examples and variations, structural components not recited in the independent claims are described as arbitrary structural components. In addition, the sizes of structural components and the ratios of the sizes in the drawings are not necessarily strictly illustrated. In each of the diagrams, substantially the same structural components are denoted by the same reference signs, and redundant description may be omitted or simplified.

In addition, in the following description, terms indicating relationships between components such as parallel and vertical and terms indicating the shapes of components such as a quadrilateral shape, and numerical ranges do not represent only the strict meanings but include also a substantially equivalent range, such as a difference of approximately several percent.

In addition, in the following description, in an example of A, B, and C being mounted on a board, "in a plan view of the board (or the principal surface of the board), C is disposed between A and B" means that a straight line connecting an arbitrary point in A and an arbitrary point in B passes through a region in C in a plan view of the board. Furthermore, a plan view of the board means that the board and circuit elements mounted on the board are orthographically projected on a plane parallel to the board.

In addition, in the following description, a "transmission path" refers to a transfer path including a line along which a radio frequency transmission signal propagates, an electrode directly connected to the line, a terminal directly connected to the line or the electrode, etc. Furthermore, a "reception path" refers to a transfer path including a line along which a radio frequency reception signal propagates, an electrode directly connected to the line, a terminal directly connected to the line or the electrode, etc.

In addition, in the following description, "A and B are connected to each other" is applied to not only the case where A and B are physically connected to each other but also the case where A and B are electrically connected to each other.

Furthermore, as used herein the terms "circuit" or "circuitry" means one or more circuits, including discrete circuit(s) as well as circuit board(s) and combinations thereof.

Embodiment

1. Circuit Configuration of Radio Frequency Module 1A and Communication Device 5A FIG. 1A is a diagram illustrating a circuit configuration of radio frequency module 1A and communication device 5A according to an embodiment. As illustrated in this diagram, communication device 5A includes radio frequency module 1A, antenna 2, RF signal processing circuit (RF integrated circuit (IC)) 3, and baseband signal processing circuit (BBIC) 4. In this exemplary configuration, the communication device is a multi-band transceiver. As used in this specification the term "module", as used with "radio frequency module", or "RF front-end module" should be construed as circuitry (programmable, as well as discrete) and associated circuit components, such as circuit boards, RF shielding, etc.

RFIC 3 is an RF signal processing circuit that processes a radio frequency signal to be transmitted by antenna 2 and a radio frequency signal received by antenna 2. More specifically, RFIC 3 performs signal processing, by down-conversion or the like, on a reception signal input via the reception path of radio frequency module 1A, and outputs the reception signal generated by the signal processing to BBIC 4. In addition, RFIC 3 performs signal processing, by up-conversion or the like, on a transmission signal input from BBIC 4, and outputs the transmission signal generated by the signal processing to the transmission path of radio frequency module 1A.

BBIC 4 is a circuit that performs signal processing using an intermediate frequency band including frequencies lower than frequencies of a radio frequency signal that is transferred through radio frequency module 1A. The signal processed by BBIC 4 is, for example, used as an image signal for image display or as a sound signal for telephone conversation via a speaker.

RFIC 3 also functions as a controller that controls the connection of switches 51, 52, 53, and 54 included in radio frequency module 1A, based on a communication band (frequency band) used. More specifically, RFIC 3 controllably switches connections between switches 51 to 54 included in radio frequency module 1A, by a control signal (not illustrated). It should be noted that the controller may be disposed outside RFIC 3, and may be disposed, for example, in radio frequency module 1A or BBIC 4. Moreover, in one example the controller is a remote computer, or a distributed computer system that communicates with radio frequency module 1A via a wireless or wired connection. Likewise, in another example, the controller is a local controller with a user interface that converts input signals into control commands that control communication device 5A as well as subcomponents, such as RF module 1A.

Antenna 2 is connected to antenna connection terminal 100 of radio frequency module 1A. Antenna 2 emits a radio frequency signal that has been output from radio frequency module 1A, and receives a radio frequency signal from the outside and outputs the radio frequency signal to radio frequency module 1A.

It should be noted that, in communication device 5A according to the present embodiment, antenna 2 and BBIC 4 are not indispensable components, and thus communication device 5A may include interface ports to receive antenna 2 and BBIC 4 as auxiliary components.

Next, a detailed configuration of radio frequency module 1A will be described.

As illustrated in FIG. 1A, radio frequency module 1A includes antenna connection terminal 100, transmission input terminals 111 and 112, reception output terminal 120, transmission power amplifier 11, reception low noise amplifier 21, transmission filters 61T and 62T, reception filters 61R and 62R, matching circuits 31 and 41, and switches 51, 52, 53, and 54.

Antenna connection terminal 100 is a common antenna terminal connected to antenna 2.

Transmission power amplifier 11 is an amplifier that includes pre-stage amplifier 11a and post-stage amplifier 11b, and amplifies transmission signals of communication band A (the first communication band) and communication band B (the second communication band) which have been input through transmission input terminals 111 and 112.

Post-stage amplifier 11b is one example of a first transmission amplifier. Post-stage amplifier 11b includes: an input terminal connected to an output terminal of pre-stage amplifier 11a; and an output terminal connected to matching circuit 31.

Pre-stage amplifier 11a is one example of a second transmission amplifier. Pre-stage amplifier 11a includes: an input terminal connected to switch 54; and an output terminal connected to the input terminal of post-stage amplifier 11b. In other words, pre-stage amplifier 11a and post-stage amplifier 11b are cascaded.

It should be noted that transmission power amplifier 11 need not necessarily include pre-stage amplifier 11a and post-stage amplifier 11b which are cascaded. Transmission power amplifier 11 may include an amplifier of a single stage, or may include amplifiers of three or more stages.

Reception low noise amplifier 21 is a reception amplifier that amplifies radio frequency signals of communication band A and communication band B with low noise, and outputs the amplified radio frequency signals to reception output terminal 120.

Transmission filter 61T is disposed on a transmission path that connects transmission power amplifier 11 and antenna connection terminal 100. Transmission filter 61T passes a transmission signal in a transmission band of communication band A, among the transmission signals that have been amplified by transmission power amplifier 11. Transmission filter 62T is disposed on a transmission path that connects transmission power amplifier 11 and antenna connection terminal 100. Transmission filter 62T passes a transmission signal in a transmission band of communication band B, among the transmission signals that have been amplified by transmission power amplifier 11.

Reception filter 61R is disposed on a reception path that connects reception low noise amplifier 21 and antenna connection terminal 100. Reception filter 61R passes a reception signal in a reception band of communication band A, among the reception signals that have been input from antenna connection terminal 100. Reception filter 62R is disposed on a reception path that connects reception low noise amplifier 21 and antenna connection terminal 100. Reception filter 62R passes a reception signal in a reception band of communication band B, among the reception signals that have been input from antenna connection terminal 100.

Transmission filter 61T and reception filter 61R are included in duplexer 61 that has, as a pass band, communication band A. Transmission filter 62T and reception filter 62R are included in duplexer 62 that has, as a pass band, communication band B.

Matching circuit 31 is disposed on a transmission path connecting transmission power amplifier 11 and transmission filters 61T and 62T, and matches the impedance of transmission power amplifier 11 with the impedance of transmission filters 61T and 62T.

Matching circuit 41 is disposed on a reception path connecting reception low noise amplifier 21 and reception filters 61R and 62R, and matches the impedance of reception low noise amplifier 21 with the impedance of reception filters 61R and 62R.

Switch 54 includes a common terminal and two selection terminals. The common terminal of switch 54 is connected to the input terminal of pre-stage amplifier 11a. One of the selection terminals of switch 54 is connected to transmission input terminal 111, and the other of the selection terminals of switch 54 is connected to transmission input terminal 112. In this connection configuration, switch 54 switches connection of the common terminal between the one of the selection terminals and the other of the selection terminals. In other words, switch 54 connects and disconnects transmission power amplifier 11 and transmission input terminals 111 and 112. Switch 54 includes, for example, a single pole double throw (SPDT) switching circuit.

It should be noted that a transmission signal of communication band A, for example, is input from transmission input terminal 111, and a transmission signal of communication band B, for example, is input from transmission input terminal 112.

In addition, a transmission signal of communication band A or B in the fourth generation mobile communication system (4G), for example, may be input from transmission input terminal 111, and a transmission signal of communication band A or B in the fifth generation mobile communication system (5G), for example, may be input from transmission input terminal 112.

Switch 51 includes a common terminal and two selection terminals. The common terminal of switch 51 is connected to the output terminal of transmission power amplifier 11 via matching circuit 31. One of the selection terminals of switch 51 is connected to transmission filter 61T, and the other of the selection terminals of switch 51 is connected to transmission filter 62T. In this connection configuration, switch 51 switches connection of the common terminal between the one of the selection terminals and the other of the selection terminals. In other words, switch 51 switches between connecting transmission power amplifier 11 to the transmission path through which a transmission signal of communication band A is transferred and connecting transmission power amplifier 11 to the transmission path through which a transmission signal of communication band B is transferred. Switch 51 includes, for example, an SPDT switching circuit.

Switch 52 includes a common terminal and two selection terminals. The common terminal of switch 52 is connected to an input terminal of reception low noise amplifier 21 via matching circuit 41. One of the selection terminals of switch 52 is connected to reception filter 61R, and the other of the selection terminals of switch 52 is connected to reception filter 62R. In this connection configuration, switch 52 switches connection of the common terminal between the one of the selection terminals and the other of the selection terminals. In other words, switch 52 switches between connecting reception low noise amplifier 21 to the reception path through which a reception signal of communication band A is transferred and connecting reception low noise amplifier 21 to the reception path through which a reception signal of communication band B is transferred. Switch 52 includes, for example, an SPDT switching circuit.

Switch 53 is one example of an antenna switch. Switch 53 is connected to antenna connection terminal 100, and switches connection of antenna connection terminal 100 between (1) the signal path through which a transmission signal and a reception signal of communication band A are transferred and (2) the signal path through which a transmission signal and a reception signal of communication band B are transferred. It should be noted that switch 53 may be a multiple-connection switching circuit capable of simultaneously performing the above-described connection of antenna connection terminal 100 to (1) and (2).

It should be noted that a multiplexer may be disposed between switch 53 and antenna connection terminal 100. In addition, a matching circuit may be disposed between switch 53 and duplexer 61, and between switch 53 and duplexer 62.

It should be noted that transmission filters 61T and 62T and reception filters 61R and 62R may be, for example, one of an acoustic wave filter using a surface acoustic wave (SAW), an acoustic wave filter using a bulk acoustic wave (BAW), an LC resonant filter, and a dielectric filter, but not limited to these filters.

In addition, transmission power amplifier 11 and reception low noise amplifier 21 include, for example, a field-effect transistor (FET), a hetero-junction bipolar transistor (HBT), etc. which include a Si complementary metal oxide semiconductor (CMOS) or GaAs as a material.

In addition, reception low noise amplifier 21 and switches 52 and 53 may be disposed in a single semiconductor integrated circuit (IC). Furthermore, the above-described semiconductor IC may further include transmission power amplifier 11 and switches 51 and 54. The semiconductor IC includes a CMOS, for example. More specifically, the semiconductor IC is formed by a silicon on insulator (SOI) process. This allows manufacturing the semiconductor ICs at low cost. It should be noted that the semiconductor IC may include at least one of GaAs, SiGe, or GaN. With this, it is possible to output a radio frequency signal having a high-quality amplification performance and noise performance.

In the configuration of radio frequency module 1A described above, switch 54, transmission power amplifier 11, matching circuit 31, switch 51, transmission filter 61T, and switch 53 are included in a first transmission circuit that transfers a transmission signal of communication band A toward antenna connection terminal 100. In addition, switch 53, reception filter 61R, switch 52, matching circuit 41, and reception low noise amplifier 21 are included in a first reception circuit that transfers a reception signal of communication band A from antenna 2 via antenna connection terminal 100.

In addition, switch 54, transmission power amplifier 11, matching circuit 31, switch 51, transmission filter 62T, and switch 53 are included in a second transmission circuit that transfers a transmission signal of communication band B toward antenna connection terminal 100. In addition, switch 53, reception filter 62R, switch 52, matching circuit 41, and reception low noise amplifier 21 are included in a second reception circuit that transfers a reception signal of communication band B from antenna 2 via antenna connection terminal 100.

According to the above-described circuit configuration, radio frequency module 1A is capable of independently transmitting, receiving, or transmitting and receiving one of a radio frequency signal of communication band A and a radio frequency signal of communication band B. In addition, radio-frequency module 1A is also capable of performing at least one of simultaneously transmitting, simultaneously receiving, or simultaneously transmitting and receiving a radio-frequency signal of communication band A and a radio frequency signal of communication band B.

It should be noted that, the radio frequency module according to the present disclosure may be implemented without connecting the above-described two transmission circuits and the above-described two reception circuits to antenna connection terminal 100 via switch 53, and the above-described two transmission circuits and the above-described two reception circuits may be connected to antenna 2 via different terminals. Furthermore, it is sufficient if the radio frequency module according to the present disclosure includes at least the first transmission circuit.

In addition, in the radio frequency module according to the present disclosure, it is sufficient if the first transmission circuit includes at least post-stage amplifier 11b and switch 54.

Figure 1B:
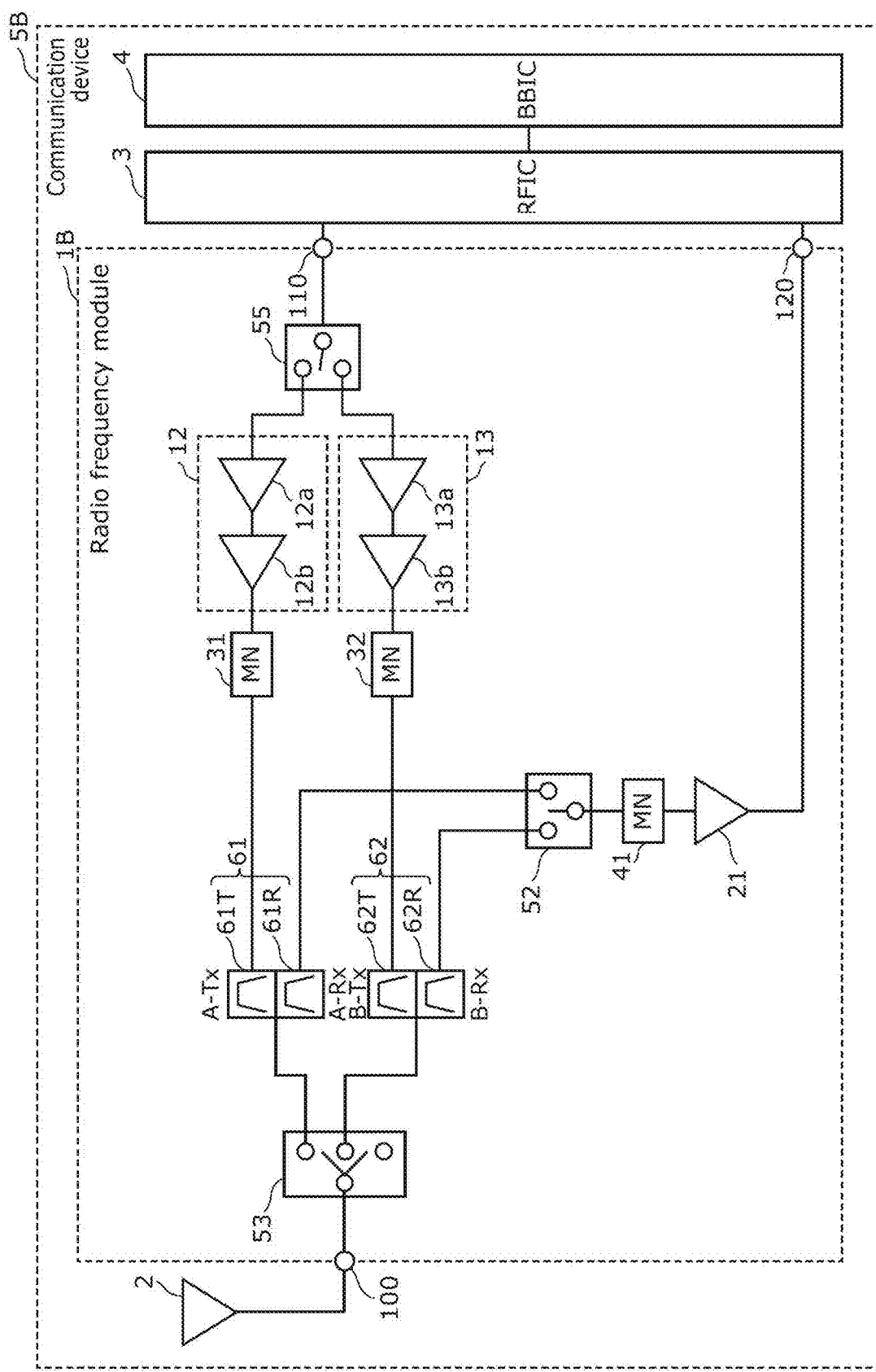
FIG. 1B is a diagram illustrating a circuit configuration of a radio frequency module and a communication device according to a variation of the embodiment.

2. Circuit Configuration of Radio Frequency Module 1B and Communication Device 5B According to Variation FIG. 1B is a diagram illustrating a circuit configuration of radio frequency module 1B and communication device 5B according to a variation of the embodiment. As illustrated in the diagram, communication device 5B includes radio frequency module 1B, antenna 2, RFIC 3, and BBIC 4. Communication device 5B according to the present variation is different from communication device 5A according to the embodiment only in the configuration of radio frequency module 1B. Hereinafter, description for antenna 2, RFIC 3, and BBIC 4 will be omitted, and the configuration of radio frequency module 1B will be described.

As illustrated in FIG. 1B, radio frequency module 1B includes antenna connection terminal 100, transmission input terminal 110, reception output terminal 120, transmission power amplifiers 12 and 13, reception low noise amplifier 21, transmission filters 61T and 62T, reception filters 61R and 62R, matching circuits 31, 32, and 41, and switches 52, 53, and 55. Radio frequency module 1B according to the present variation is different in the configuration of the transmission circuit from radio frequency module 1A according to the embodiment. Hereinafter, radio frequency module 1B according to the present variation will be described. In the description, the same points as those of radio frequency module 1A according to the embodiment will be omitted, and different points will be mainly described.

Transmission power amplifier 12 is an amplifier that includes pre-stage amplifier 12a and post-stage amplifier 12b, and amplifies a transmission signal of communication band A (the first communication band) which has been input from transmission input terminal 110.

Post-stage amplifier 12b is one example of the first transmission amplifier. Post-stage amplifier 12b includes: an input terminal connected to an output terminal of pre-stage amplifier 12a; and an output terminal connected to matching circuit 31.

Pre-stage amplifier 12a is one example of a second transmission amplifier. Pre-stage amplifier 12a includes: an input terminal connected to switch 55; and an output terminal connected to the input terminal of post-stage amplifier 12b. In other words, pre-stage amplifier 12a and post-stage amplifier 12b are cascaded.

It should be noted that transmission power amplifier 12 need not necessarily include pre-stage amplifier 12a and post-stage amplifier 12b which are cascaded. Transmission power amplifier 12 may include an amplifier of a single stage, or may include amplifiers of three or more stages.

Transmission power amplifier 13 is an amplifier that includes pre-stage amplifier 13a and post-stage amplifier 13b, and amplifies a transmission signal of communication band B (the second communication band) which has been input from transmission input terminal 110.

Post-stage amplifier 13b is one example of the third transmission amplifier. Post-stage amplifier 13b includes: an input terminal connected to an output terminal of pre-stage amplifier 13a; and an output terminal connected to matching circuit 32.

Pre-stage amplifier 13a is one example of a fourth transmission amplifier. Pre-stage amplifier 13a includes: an input terminal connected to switch 55; and an output terminal connected to the input terminal of post-stage amplifier 13b. In other words, pre-stage amplifier 13a and post-stage amplifier 13b are cascaded.

It should be noted that transmission power amplifier 13 need not necessarily include pre-stage amplifier 13a and post-stage amplifier 13b which are cascaded. Transmission power amplifier 13 may include an amplifier of a single stage, or may include amplifiers of three or more stages.

Transmission filter 61T is disposed on a transmission path that connects transmission power amplifier 12 and antenna connection terminal 100. Transmission filter 61T passes a transmission signal in a transmission band of communication band A that has been amplified by transmission power amplifier 12. Transmission filter 62T is disposed on a transmission path that connects transmission power amplifier 13 and antenna connection terminal 100. Transmission filter 62T passes a transmission signal in a transmission band of communication band B that has been amplified by transmission power amplifier 13.

Matching circuit 31 is disposed on a transmission path that connects transmission power amplifier 12 and transmission filter 61T. Matching circuit 31 matches the impedance of transmission power amplifier 12 with the impedance of transmission filter 61T. Matching circuit 32 is disposed on a transmission path that connects transmission power amplifier 13 and transmission filter 62T. Matching circuit 32 matches the impedance of transmission power amplifier 13 with the impedance of transmission filter 62T.

Switch 55 includes a common terminal and two selection terminals. The common terminal of switch 55 is connected to transmission input terminal 110. One of the selection terminals of switch 55 is connected to the input terminal of pre-stage amplifier 12a. The other of the selection terminals of switch 55 is connected to the input terminal of pre-stage amplifier 13a. In this connection configuration, switch 55 switches connection of the common terminal between the one of the selection terminals and the other of the selection terminals. In other words, switch 55 connects and disconnects transmission input terminal 110 and transmission power amplifiers 12 and 13. Switch 55 includes, for example, an SPDT switching circuit.

It should be noted that transmission signals of communication band A and communication band B, for example, are input from transmission input terminal 110.

In addition, for example, a transmission signal of communication band A in 4G and a transmission signal of communication band B in 5G may be input from transmission input terminal 110.

It should be noted that switch 55 may have a configuration of a double pole double throw (DPDT) switching circuit that includes two common terminals and two selection terminals. In this case, radio frequency module 1B includes two transmission input terminals 111 and 112, transmission input terminal 111 is connected to one of the common terminals of switch 55, and transmission input terminal 112 is connected to the other of the common terminals of switch 55. In this connection configuration, switch 55 switches connection of the one of the common terminals between the one of the selection terminals and the other of the selection terminals, and switches connection of the other of the common terminals between the one of the selection terminals and the other of the selection terminals. In other words, switch 55 connects and disconnects transmission input terminal 111 and transmission power amplifiers 12 and 13, and connects and disconnects transmission input terminal 112 and transmission power amplifiers 12 and 13. In this case, for example, a transmission signal of communication band A is input from transmission input terminal 111, and a transmission signal of communication band B, for example, is input from transmission input terminal 112.

In addition, for example, transmission signals of communication band A and communication band B in 4G may be input from transmission input terminal 111, and transmission signals of communication band A and communication band B in 5G may be input from transmission input terminal 112.

In addition, transmission power amplifiers 12 and 13 and reception low noise amplifier 21 include, for example, a field-effect transistor (FET), a hetero-junction bipolar transistor (HBT), etc. which include a Si complementary metal oxide semiconductor (CMOS) or GaAs as a material.

In the configuration of radio frequency module 1B described above, switch 55, transmission power amplifier 12, matching circuit 31, transmission filter 61T, and switch 53 are included in a first transmission circuit that transfers a transmission signal of communication band A toward antenna connection terminal 100. In addition, switch 53, reception filter 61R, switch 52, matching circuit 41, and reception low noise amplifier 21 are included in a first reception circuit that transfers a reception signal of communication band A from antenna 2 via antenna connection terminal 100.

In addition, switch 55, transmission power amplifier 13, matching circuit 32, transmission filter 62T, and switch 53 are included in a second transmission circuit that transfers a transmission signal of communication band B toward antenna connection terminal 100. In addition, switch 53, reception filter 62R, switch 52, matching circuit 41, and reception low noise amplifier 21 are included in a second reception circuit that transfers a reception signal of communication band B from antenna 2 via antenna connection terminal 100.

According to the above-described circuit configuration, radio frequency module 1B is capable of independently transmitting, receiving, or transmitting and receiving one of a radio frequency signal of communication band A and a radio frequency signal of communication band B. In addition, radio-frequency module 1B is also capable of performing at least one of simultaneously transmitting, simultaneously receiving, or simultaneously transmitting and receiving a radio-frequency signal of communication band A and a radio frequency signal of communication band B.

3. Miniaturization of Radio Frequency Modules 1A and 1B

Here, when each of the circuit elements included in radio frequency module 1A or 1B is mounted on a single module board as a small-sized front-end circuit, it is necessary to reduce the layout area for the circuit components on the surface of the module board. In this case, a signal path on the input side of the transmission power amplifier and a signal path on the output side of the transmission power amplifier are located close to each other, and thus it is expected that the isolation between the two signal paths deteriorates. When the isolation between the signal path on the input side of the transmission power amplifier and the signal path on the output side of the transmission power amplifier deteriorates, a feedback loop of an unnecessary radio frequency signal is formed between the input and the output of the transmission power amplifier due to the two signal paths. In this case, the transmission power amplifier oscillates under a certain conditions, and there arises a problem that the operation of the transmission power amplifier becomes unstable.

In contrast, radio frequency modules 1A and 1B each have a configuration that reduces electric field coupling, magnetic field coupling, or electromagnetic field coupling between the signal path of the input side and the signal path of the output side of the transmission power amplifier. The following describes a configuration that improves the isolation between the input and output of the transmission power amplifier of each of radio frequency module 1A according to the embodiment and radio frequency module 1B according to the variation.

4. Arrangement Configuration of Circuit Elements of Radio Frequency Module 1A According to Working Example 1

Figure 2A:
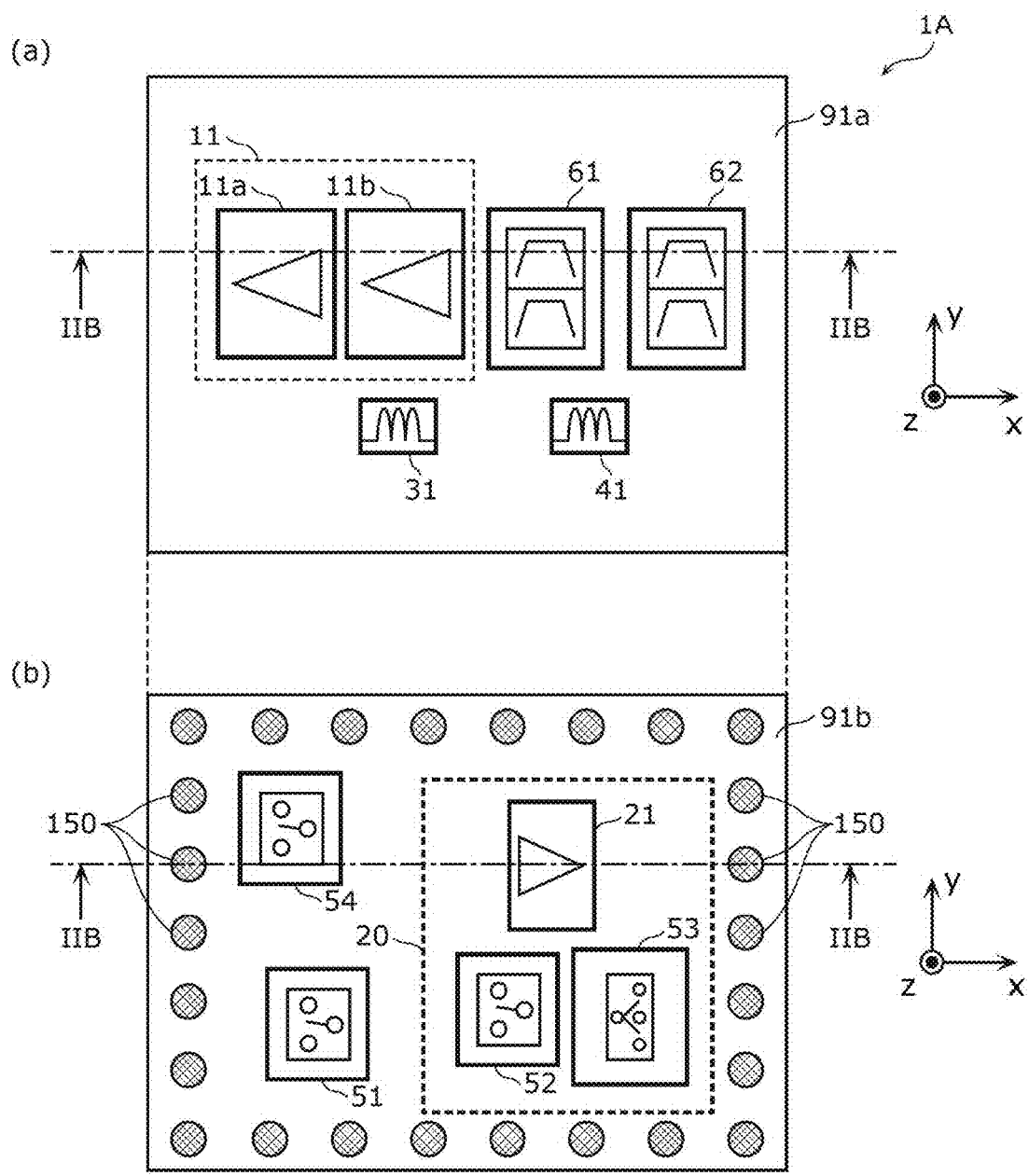
FIG. 2A is a schematic diagram illustrating a plan view configuration of a radio frequency module according to Working Example 1.
Figure 2B:
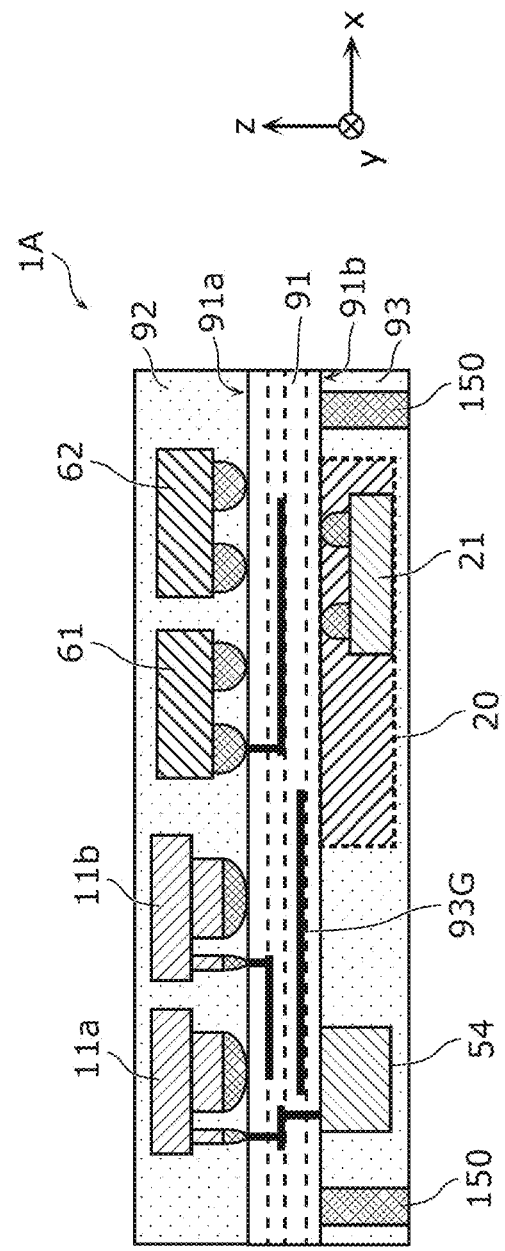
FIG. 2B is a schematic diagram illustrating a cross-sectional configuration of the radio frequency module according to Working example 1.

FIG. 2A is a schematic diagram illustrating a plan view configuration of radio frequency module 1A according to Working Example 1. FIG. 2B is a schematic diagram illustrating a cross-sectional configuration of radio frequency module 1A according to Working Example 1. More specifically, FIG. 2B is a cross-sectional view taken along line IIB-IIB of FIG. 2A. It should be noted that (a) in FIG. 2A illustrates a layout of the circuit elements when, of principal surfaces 91a and 91b located on opposite sides of module board 91, principal surface 91a is viewed from the z-axis positive side. Meanwhile, (b) in FIG. 2A illustrates a perspective view of the layout of the circuit elements when principal surface 91b is viewed from the z-axis positive side.

In radio frequency module 1A according to the working example, the arrangement configuration of the respective circuit elements included in radio frequency module 1A according to the embodiment as illustrated in FIG. 1A is specifically illustrated.

As illustrated in FIG. 2A and FIG. 2B, radio frequency module 1A according to the present working example includes module board 91, resin components 92 and 93, and external-connection terminals 150 in addition to the circuit configuration illustrated in FIG. 1A.

Module board 91 is a board which includes principal surface 91a (the first principal surface) and principal surface 91b (the second principal surface) on opposite sides thereof, and on which the above-described transmission circuit and the above-described reception circuit are mounted. As module board 91, for example, a low temperature co-fired ceramic (LTCC) board having a stacked structure including a plurality of dielectric layers, a high temperature co-fired ceramic (HTCC) board, a component built-in board, a board including a redistribution layer (RDL), or a printed board or the like is used.

Resin component 92 is disposed on principal surface 91a of module board 91 and covers a portion of the above-described transmission circuit, a portion of the above-described reception circuit, and principal surface 91a of module board 91. Resin component 92 has a function of ensuring reliability such as mechanical strength and moisture resistance of the circuit elements included in the above-described transmission circuit and the above-described reception circuit. Resin component 93 is disposed on principal surface 91b of module board 91 and covers a portion of the above-described transmission circuit, a portion of the above-described reception circuit, and principal surface 91b of module board 91. Resin component 93 has a function of ensuring reliability such as mechanical strength and moisture resistance of the circuit elements included in the above-described transmission circuit and the above-described reception circuit. It should be noted that resin components 92 and 93 are not indispensable components for the radio frequency module according to the present disclosure.

As illustrated in FIG. 2A and FIG. 2B, in radio frequency module 1A according to the present working example, transmission power amplifier 11, duplexers 61 and 62, and matching circuits 31 and 41 are surface-mounted on principal surface 91a of module board 91. Reception low noise amplifier 21 and switches 51, 52, 53, and 54 are surface-mounted on principal surface 91b of module board 91.

According to the present working example, post-stage amplifier 11b (the first transmission amplifier) is mounted on principal surface 91a. Switch 54 is mounted on principal surface 91b.

According to the above-described configuration, post-stage amplifier 11b is disposed on principal surface 91a of module board 91, and switch 54 is disposed on principal surface 91b of module board 91. In other words, post-stage amplifier 11b and switch 54 are arranged with module board 91 interposed therebetween. With this configuration, it is possible to reduce the electric field coupling, the magnetic field coupling, or the electromagnetic field coupling between switch 54 disposed on the input side of transmission power amplifier 11 and an output line of post-stage amplifier 11b disposed on the output side of transmission power amplifier 11. For that reason, it is possible to inhibit transmission power amplifier 11 from oscillating as a result of formation of an unnecessary feedback loop that transfers a radio frequency signal between the input and output of transmission power amplifier 11. It is thus possible to reduce an unstable operation of transmission power amplifier 11.

It is desirable that module board 91 have a multilayer structure in which a plurality of dielectric layers are stacked, and that at least one of the plurality of dielectric layers include ground electrode pattern 93G formed thereon. With this configuration, the electromagnetic field shielding function of module board 91 is improved, and the isolation between the circuit elements disposed on principal surface 91a and the circuit elements disposed on principal surface 91b is improved.

In addition, in radio frequency module 1A according to the present working example, pre-stage amplifier 11a is mounted on principal surface 91a. In other words, pre-stage amplifier 11a and switch 54 are arranged with module board 91 interposed therebetween. With this configuration, it is possible to reduce the electric field coupling, the magnetic field coupling, or the electromagnetic field coupling between switch 54 disposed on the input side of transmission power amplifier 11 and an output line of pre-stage amplifier 11a. For that reason, it is possible to inhibit pre-stage amplifier 11a from oscillating as a result of formation of an unnecessary feedback loop that transfers a radio frequency signal between the input and output of pre-stage amplifier 11a. It is thus possible to reduce an unstable operation of transmission power amplifier 11.

It should be noted that, in radio frequency module 1A according to the present working example, it is sufficient if post-stage amplifier 11b and switch 54 are separately disposed on principal surface 91a and principal surface 91b of module board 91, and the other circuit components may be disposed on any of principal surface 91a and principal surface 91b, or may be built-in in module board 91.

Furthermore, in radio frequency module 1A according to the present working example, it is desirable that a footprint of pre-stage amplifier 11a overlaps with a footprint of switch 54 in a plan view of module board 91.

According to this configuration, it is possible to connect pre-stage amplifier 11a and switch 54 via a via conductor formed in module board 91 along the direction perpendicular to principal surfaces 91a and 91b (the z-axis direction). It is thus possible to reduce the length of the line connecting pre-stage amplifier 11a and switch 54. As a result, it is possible to reduce transfer loss of transmission signals.

Matching circuits 31 and 41 are mounted on principal surface 91a of module board 91. Each of matching circuits 31 and 41 includes an inductor. Inductors included in matching circuits 31 and 41 each include, for example, a chip inductor or a line pattern disposed on principal surface 91a.

According to the above-described configuration, matching circuit 31 is disposed on principal surface 91a of module board 91, and switch 54 is disposed on principal surface 91b. In other words, the inductor of matching circuit 31 and switch 54 are arranged with module board 91 interposed therebetween. According to this configuration, it is possible to reduce the electric field coupling, the magnetic field coupling, or the electromagnetic field coupling between switch 54 disposed on the input side of transmission power amplifier 11 and the inductor of matching circuit 31 disposed on the output side of transmission power amplifier 11. For that reason, it is possible to further inhibit transmission power amplifier 11 from oscillating as a result of formation of an unnecessary feedback loop that transfers a radio frequency signal between the input and output of transmission power amplifier 11. It is thus possible to further reduce an unstable operation of transmission power amplifier 11.

In addition, in radio frequency module 1A according to the present working example, a plurality of external-connection terminals 150 are disposed on principal surface 91b of module board 91. Radio frequency module 1A exchanges electrical signals with a motherboard disposed on the z-axis negative side of radio frequency module 1A via the plurality of external-connection terminals 150. In addition, one or some of the plurality of external-connection terminals 150 are set to the ground potential of the motherboard.

In addition, in radio frequency module 1A according to the present working example, transmission power amplifier 11 is mounted on principal surface 91a.

Transmission power amplifier 11 is a component that generates a large amount of heat among the circuit components included in radio frequency module 1A. In order to improve the heat dissipation property of radio frequency module 1A, it is important to dissipate heat generated by transmission power amplifier 11 to the motherboard through a heat dissipation path having a small thermal resistance. If transmission power amplifier 11 is mounted on principal surface 91b, the electrode line connected to transmission power amplifier 11 is disposed on principal surface 91b. For that reason, as the heat dissipation path, a heat dissipation path that passes through only a planar line pattern (along the xy plane direction) on principal surface 91b is included. The above-described planar line pattern is formed using a metal thin film, and thus has a large thermal resistance. For that reason, when transmission power amplifier 11 is disposed on principal surface 91b, the heat dissipation property is decreased.

In contrast, when transmission power amplifier 11 is mounted on principal surface 91a, it is possible to connect transmission power amplifier 11 to external-connection terminals 150 via a penetrating electrode that penetrates through module board 91 between principal surface 91a and principal surface 91b. As a result, it is possible to exclude a heat dissipation path that passes through only the planar line pattern along the xy plane direction which has a large thermal resistance, from among the lines in module board 91 as the heat dissipation paths for transmission power amplifier 11. It is thus possible to provide radio frequency module 1A having a small size and an improved heat dissipation property for dissipating heat from transmission power amplifier 11 to the motherboard.

It should be noted that, in terms of the heat dissipation property, it is desirable that the above-described penetrating electrode or the heat dissipation component be disposed in a region of principal surface 91b across a region of principal surface 91a in which post-stage amplifier 11b is disposed. Accordingly, it is desirable that no circuit element be disposed in the region of principal surface 91a.

In addition, in radio frequency module 1A according to the present working example, reception low noise amplifier 21 is mounted on principal surface 91b.

According to the-above described configuration, transmission power amplifier 11 and reception low noise amplifier 21 are arranged with module board 91 interposed therebetween, and thus it is possible to improve the isolation between the transmission side and the reception side.

In addition, of principal surfaces 91a and 91b, transmission power amplifier 11 which is difficult to reduce the height is not disposed on principal surface 91b that faces the motherboard, but reception low noise amplifier 21 and switches 51 to 54 which are easy to reduce the height are disposed on principal surface 91b, and thus it is possible to reduce the height of radio frequency module 1A as a whole. In addition, a plurality of external-connection terminals 150 that are applied as ground electrodes are disposed in the vicinity of reception low noise amplifier 21 that significantly affects the reception sensitivity of the reception circuit. As a result, it is possible to reduce deterioration of the reception sensitivity of the reception circuit.

It should be noted that reception low noise amplifier 21 and switches 52 and 53 may be built-in in single semiconductor IC 20, as illustrated in FIG. 2A and FIG. 2B. According to the above-described configuration, it is possible to reduce the height on the principal surface 91b side in the z-axis direction, and also possible to reduce the component mounting area of principal surface 91b. As a result, it is possible to reduce the size of radio frequency module 1A. In addition, semiconductor IC 20 may include switches 51 and 54.

Figure 2C:
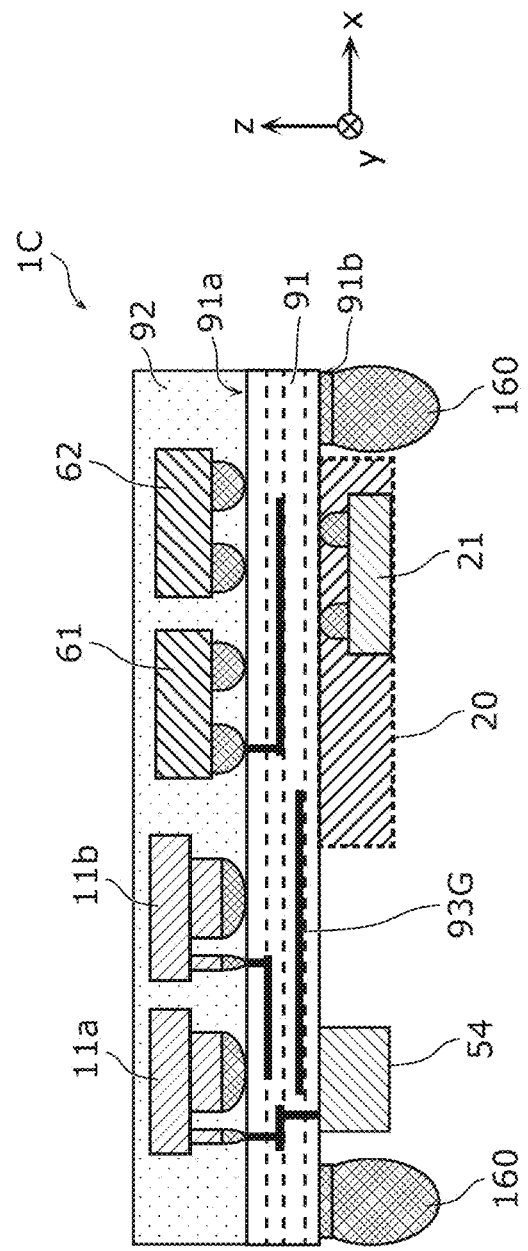
FIG. 2C is a schematic diagram illustrating a cross-sectional configuration of a radio frequency module according to Working Example 2.

It should be noted that external-connection terminals 150 may be columnar electrodes that penetrate through resin component 93 in the z-axis direction as illustrated in FIG. 2A and FIG. 2B, or bump electrodes 160 formed on principal surface 91b as illustrated in FIG. 2C. When external-connection terminals 150 are bump electrodes 160 as illustrated in FIG. 2C, resin component 93 is not disposed on principal surface 91b.

In addition, external-connection terminals 150 may be disposed on principal surface 91a.

5. Arrangement Configuration of Circuit Elements of Radio Frequency Module 1B According to Working Example 3

Figure 3A:
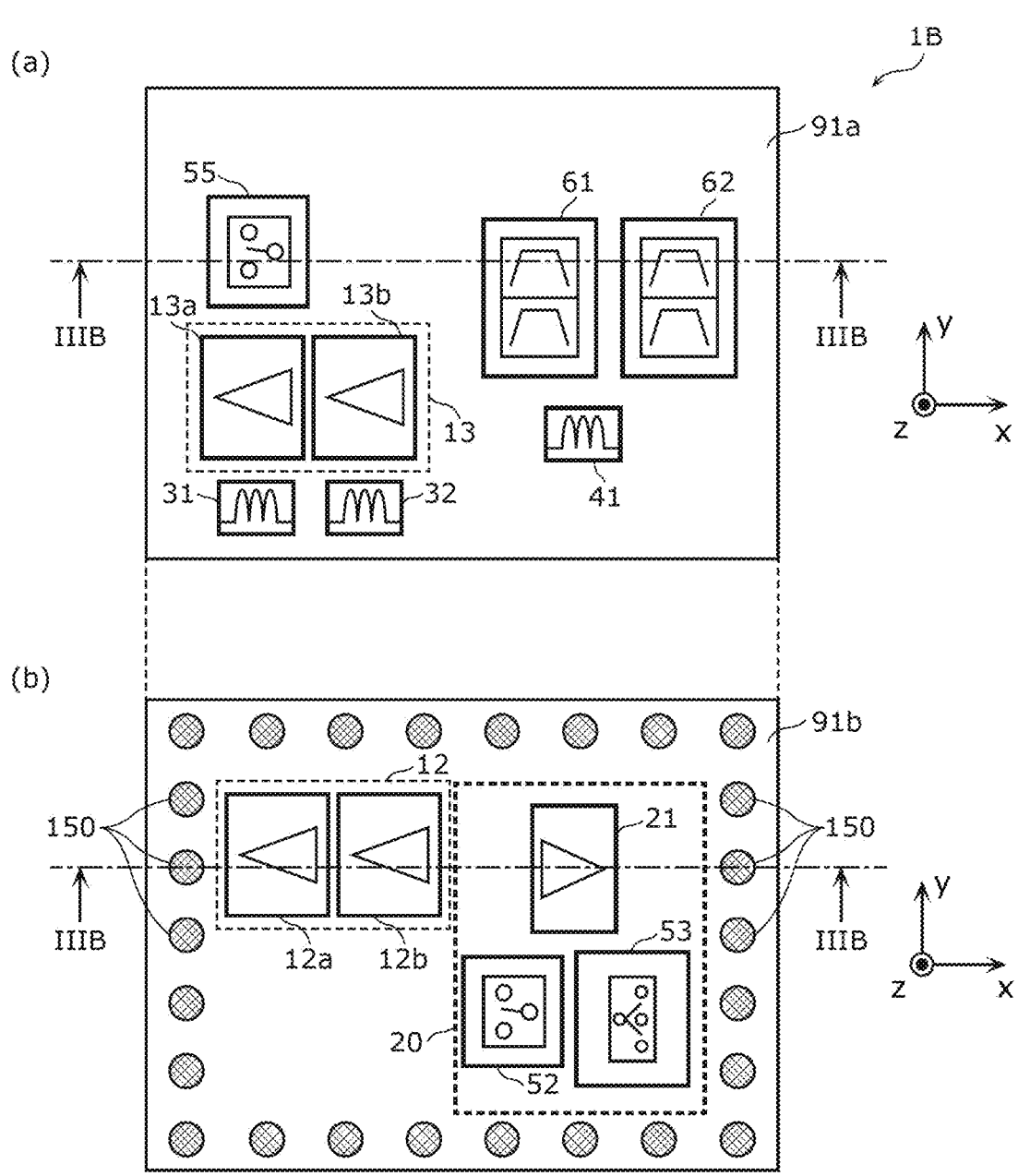
FIG. 3A is a schematic diagram illustrating a plan view configuration of a radio frequency module according to Working Example 3.
Figure 3B:
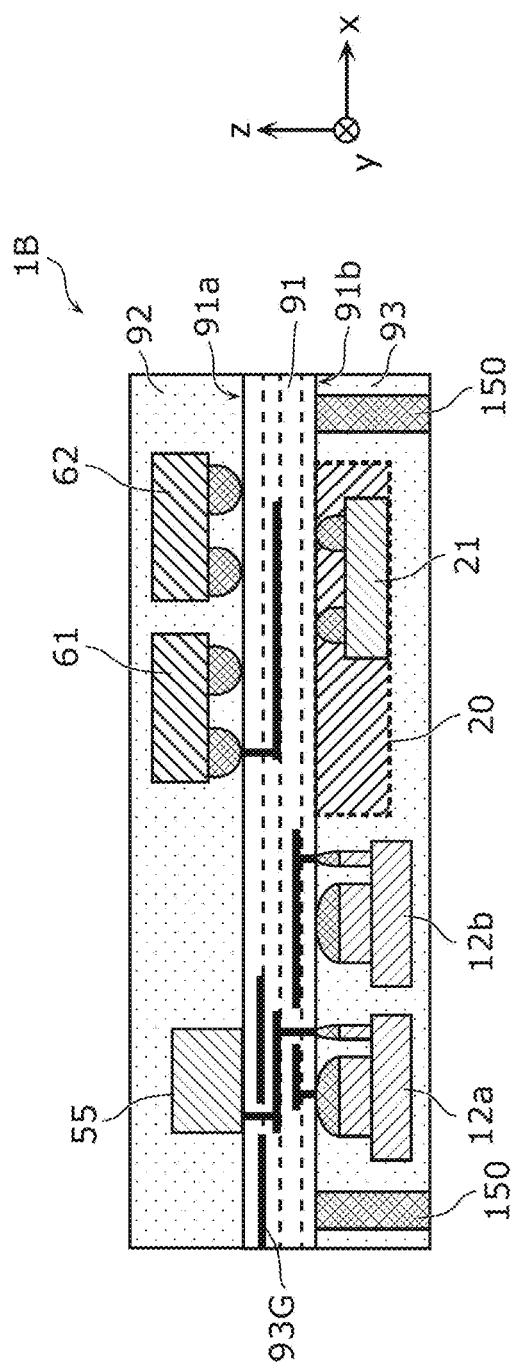
FIG. 3B is a schematic diagram illustrating a cross-sectional configuration of the radio frequency module according to Working example 3.

FIG. 3A is a schematic diagram illustrating a plan view configuration of radio frequency module 1B according to Working Example 3. FIG. 3B is a schematic diagram illustrating a cross-sectional configuration of radio frequency module 1B according to Working Example 3. More specifically, FIG. 3B is a cross-sectional view taken along line IIIB-IIIB of FIG. 3A. It should be noted that (a) in FIG. 3A illustrates a layout of the circuit elements when, of principal surfaces 91a and 91b located on opposite sides of module board 91, principal surface 91a is viewed from the z-axis positive side. Meanwhile, (b) in FIG. 3A illustrates a perspective view of the layout of the circuit elements when principal surface 91b is viewed from the z-axis positive side.

Radio frequency module 1B according to Working Example 3 specifically illustrates the arrangement configuration of the respective circuit elements included in radio frequency module 1B according to the variation of the embodiment illustrated in FIG. 1B.

Radio frequency module 1B according to the present working example is different from radio frequency module 1A according to Working Example 1 in that two transmission power amplifiers 12 and 13 and two matching circuits 31 and 32 are mounted on module board 91. Hereinafter, radio frequency module 1B according to the present working example will be described. In the description, the same points as those of radio frequency module 1A according to Working Example 1 will be omitted, and different points will be mainly described.

Module board 91 is a board which includes principal surface 91a (the second principal surface) and principal surface 91b (the first principal surface) on opposite sides thereof, and on which the above-described transmission circuit and the above-described reception circuit are mounted. As module board 91, for example, an LTCC board having a stacked structure including a plurality of dielectric layers, an HTCC board, a component built-in board, an RDL, or a printed board or the like is used.

As illustrated in FIG. 3A and FIG. 3B, in radio frequency module 1B according to the present working example, transmission power amplifier 13, duplexers 61 and 62, matching circuits 31, 32, and 41, and switch 55 are surface-mounted on principal surface 91a of module board 91. Transmission power amplifier 12, reception low noise amplifier 21, and switches 52 and 53 are surface-mounted on principal surface 91b of module board 91.

According to the present working example, post-stage amplifier 12b (the first transmission amplifier) is mounted on principal surface 91b (the first principal surface). Switch 55 is mounted on principal surface 91a (the second principal surface).

According to the above-described configuration, post-stage amplifier 12b is disposed on principal surface 91b of module board 91, and switch 55 is disposed on principal surface 91a of module board 91. In other words, post-stage amplifier 12b and switch 55 are arranged with module board 91 interposed therebetween. With this configuration, it is possible to reduce the electric field coupling, the magnetic field coupling, or the electromagnetic field coupling between switch 55 disposed on the input side of transmission power amplifier 12 and an output line of post-stage amplifier 12b disposed on the output side of transmission power amplifier 12. For that reason, it is possible to inhibit transmission power amplifier 12 from oscillating as a result of formation of an unnecessary feedback loop that transfers a radio frequency signal between the input and output of transmission power amplifier 12. It is thus possible to reduce an unstable operation of transmission power amplifier 12.

In addition, in radio frequency module 1B according to the present working example, pre-stage amplifier 12a is mounted on principal surface 91b. In other words, pre-stage amplifier 12a and switch 55 are arranged with module board 91 interposed therebetween. With this configuration, it is possible to reduce the electric field coupling, the magnetic field coupling, or the electromagnetic field coupling between switch 55 disposed on the input side of transmission power amplifier 12 and an output line of pre-stage amplifier 12a. For that reason, it is possible to inhibit pre-stage amplifier 12a from oscillating as a result of formation of an unnecessary feedback loop that transfers a radio frequency signal between the input and output of pre-stage amplifier 12a. It is thus possible to reduce an unstable operation of transmission power amplifier 12.

According to the present working example, post-stage amplifier 13b (the third transmission amplifier) is mounted on principal surface 91a (the second principal surface).

According to the above-described configuration, post-stage amplifier 12b that amplifies a transmission signal of communication band A and post-stage amplifier 13b that amplifies a transmission signal of communication band B are arranged with module board 91 interposed therebetween, and thus it is possible to improve the isolation between the different communication bands.

In addition, as illustrated in FIG. 3A, it is desirable that a footprint of post-stage amplifier 12b does not overlap with a footprint of post-stage amplifier 13b in a plan view of module board 91.

According to the above-described configuration, it is possible to ensure a large distance between post-stage amplifier 12b and post-stage amplifier 13b. As a result, it is possible to further improve the isolation between the different communication bands.

It should be noted that, in radio frequency module 1B according to the present working example, it is sufficient if: post-stage amplifier 12b and switch 55 are separately disposed on principal surface 91a and principal surface 91b of module board 91; and post-stage amplifier 12b and post-stage amplifier 13b are separately disposed on principal surface 91a and principal surface 91b of module board 91, and the other circuit components may be disposed on any of principal surface 91a and principal surface 91b, or may be built-in in module board 91.

Furthermore, in radio frequency module 1B according to the present working example, it is desirable that a footprint of pre-stage amplifier 12a overlaps with a footprint of switch 55 in a plan view of module board 91.

According to the-above described configuration, it is possible to connect pre-stage amplifier 12a and switch 55 via a via conductor formed in module board 91 along the direction perpendicular to principal surfaces 91a and 91b (the z-axis direction). It is thus possible to reduce the length of the line connecting pre-stage amplifier 12a and switch 55. As a result, it is possible to reduce transfer loss of transmission signals of communication band A.

In addition, in radio frequency module 1B according to the present working example, a plurality of external-connection terminals 150 are disposed on principal surface 91b of module board 91. Radio frequency module 1B exchanges electrical signals with a motherboard disposed on the z-axis negative side of radio frequency module 1B via the plurality of external-connection terminals 150. In addition, one or some of the plurality of external-connection terminals 150 are set to the ground potential of the motherboard.

In addition, in radio frequency module 1B according to the present working example, transmission power amplifier 13 is mounted on principal surface 91a.

Transmission power amplifier 13 is a component that generates a large amount of heat among the circuit components included in radio frequency module 1B. In order to improve the heat dissipation property of radio frequency module 1B, it is important to dissipate heat generated by transmission power amplifier 13 to the motherboard through a heat dissipation path having a small thermal resistance. When transmission power amplifier 13 is mounted on principal surface 91a, it is possible to connect transmission power amplifier 13 to external-connection terminals 150 via a penetrating electrode that penetrates through module board 91 between principal surface 91a and principal surface 91b. As a result, it is possible to exclude a heat dissipation path that passes through only the planar line pattern along the xy plane direction which has a large thermal resistance, from among the lines in module board 91 as the heat dissipation paths for transmission power amplifier 13. It is thus possible to provide radio frequency module 1B having a small size and an improved heat dissipation property for dissipating heat from transmission power amplifier 13 to the motherboard.

It should be noted that, in terms of the heat dissipation property, it is desirable that the above-described penetrating electrode or the heat dissipation component be disposed in a region of principal surface 91b across a region of principal surface 91a in which post-stage amplifier 13b is disposed. Accordingly, it is desirable that no circuit element be disposed in the region of principal surface 91a.

In addition, in radio frequency module 1B according to the present working example, reception low noise amplifier 21 is mounted on principal surface 91b.

According to the-above described configuration, transmission power amplifier 13 and reception low noise amplifier 21 are arranged with module board 91 interposed therebetween, and thus it is possible to improve the isolation between the transmission side and the reception side for communication band B.

In addition, on principal surface 91b, a plurality of external-connection terminals 150 that are applied as ground electrodes are disposed in the vicinity of reception low noise amplifier 21 that significantly affects the reception sensitivity of the reception circuit. As a result, it is possible to reduce deterioration of the reception sensitivity of the reception circuit.

It should be noted that reception low noise amplifier 21 and switches 52 and 53 may be built-in in single semiconductor IC 20, as illustrated in FIG. 3A and FIG. 3B. According to the above-described configuration, it is possible to reduce the component mounting area of principal surface 91b. As a result, it is possible to reduce the size of radio frequency module 1B.

It should be noted that external-connection terminals 150 may be bump electrodes 160 disposed on principal surface 91b. In this case, resin component 93 is not disposed on principal surface 91b.

In addition, external-connection terminals 150 may be disposed on principal surface 91a.

6. Arrangement Configuration of Circuit Elements of Radio Frequency Module 1D According to Working Example 4

Figure 4A:
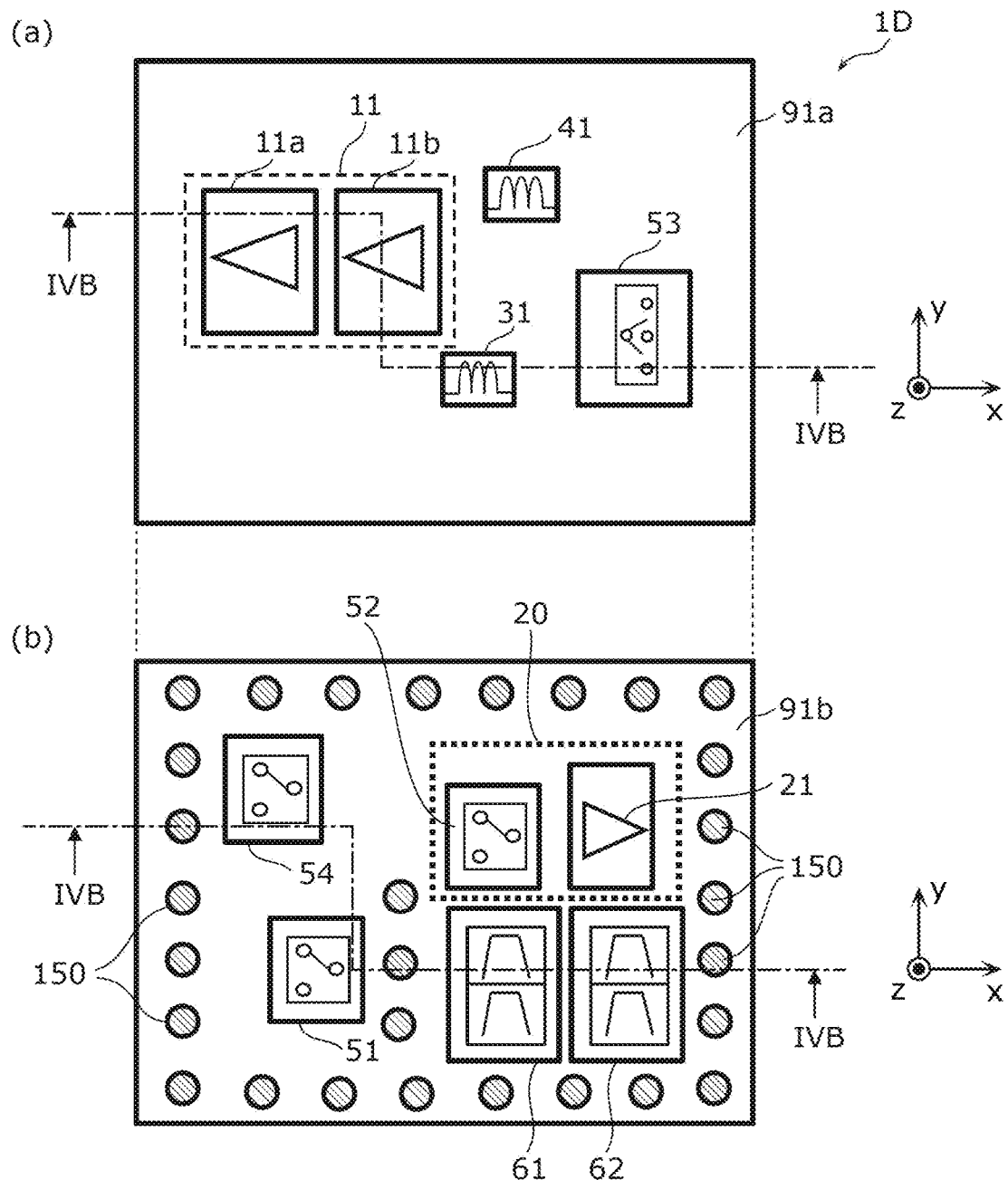
FIG. 4A is a schematic diagram illustrating a plan view configuration of a radio frequency module according to Working Example 4.
Figure 4B:
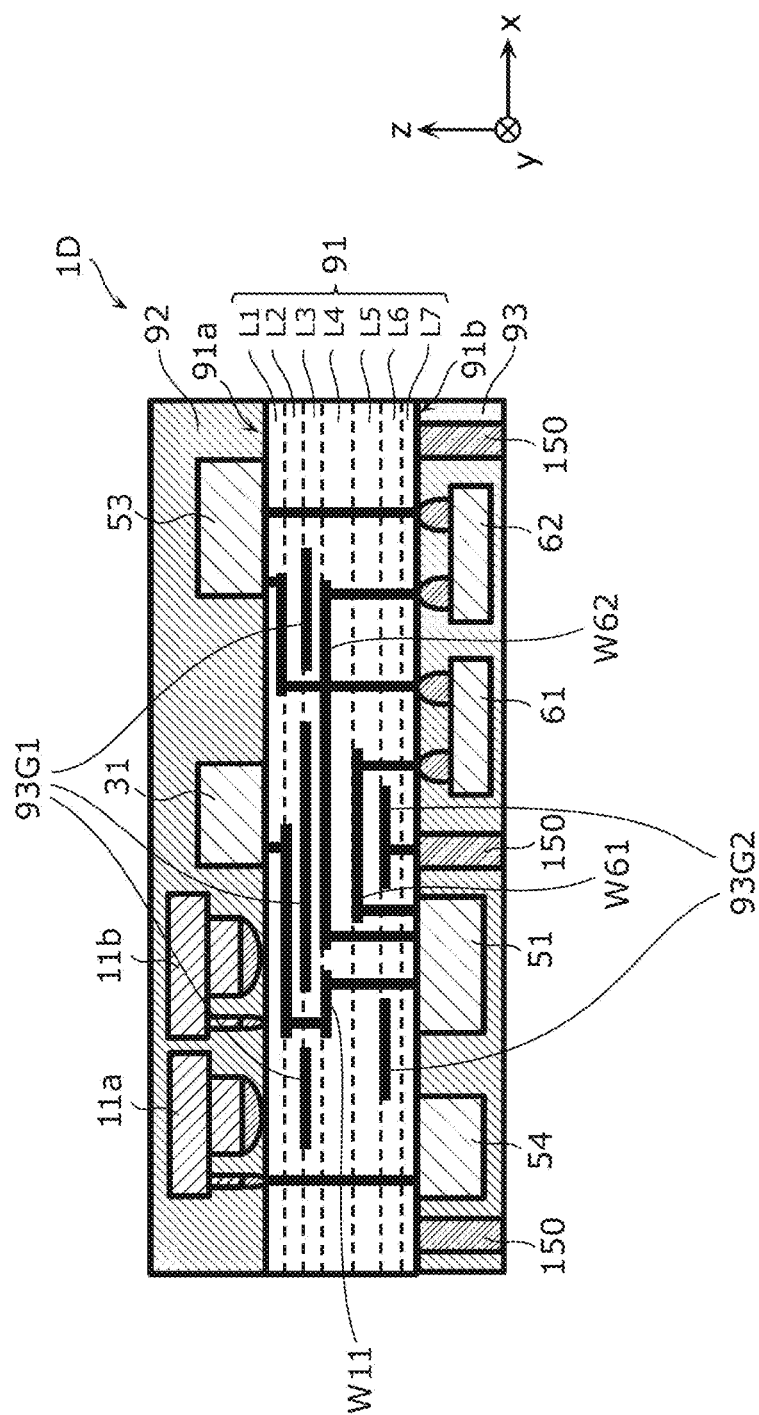
FIG. 4B is a schematic diagram illustrating a cross-sectional configuration of the radio frequency module according to Working example 4.

FIG. 4A is a schematic diagram illustrating a plan view configuration of radio frequency module 1D according to Working Example 4. FIG. 4B is a schematic diagram illustrating a cross-sectional configuration of radio frequency module 1D according to Working Example 4. More specifically, FIG. 4B is a cross-sectional view taken along line IVB-IVB of FIG. 4A. It should be noted that (a) in FIG. 4A illustrates a layout of the circuit elements when, of principal surfaces 91a and 91b located on opposite sides of module board 91, principal surface 91a is viewed from the z-axis positive side. Meanwhile, (b) in FIG. 4A illustrates a perspective view of the layout of the circuit elements when principal surface 91b is viewed from the z-axis positive side.

In radio frequency module 1D according to working example 4, the arrangement configuration of the respective circuit elements included in radio frequency module 1A according to the embodiment as illustrated in FIG. 1A is specifically illustrated.

Radio frequency module 1D according to the present working example is different from radio frequency module 1A according to Working Example 1 particularly in the arrangement configuration of duplexers 61 and 62 and switch 53. Hereinafter, radio frequency module 1D according to the present working example will be described. In the description, the same points as those of radio frequency module 1A according to Working Example 1 will be omitted, and different points will be mainly described.

Module board 91 is a board which includes principal surface 91a (the first principal surface) and principal surface 91b (the second principal surface) on opposite sides thereof, and on which the above-described transmission circuit and the above-described reception circuit are mounted. As module board 91, for example, an LTCC board having a stacked structure including a plurality of dielectric layers, an HTCC board, a component built-in board, a board that includes an RDL, or a printed board or the like is used. Module board 91 according to the present working example includes dielectric layers L1, L2, L3, L4, L5, L6, and L7 disposed in stated order from the principal surface 91a side. Dielectric layers L4 and L5 are each thicker than any of dielectric layers L1, L2, L3, L6, and L7, and each not a surface layer that defines principal surface 91a or 91b but an inner layer. Dielectric layer L4 is located at the center of a plurality of dielectric layers included in module board 91, and dielectric layer L5 is adjacent to the layer located at the center of the plurality of dielectric layers.

As illustrated in FIGS. 4A and 4B, in radio frequency module 1D according to the present working example, transmission power amplifier 11, matching circuits 31 and 41, and switch 53 are disposed on principal surface 91a of module board 91. Meanwhile, duplexers 61 and 62, reception low noise amplifier 21, and switches 51, 52, and 54 are disposed on principal surface 91b of module board 91.

According to the present working example, post-stage amplifier 11b (the first transmission amplifier) is mounted on principal surface 91a (the first principal surface). Meanwhile, switch 54 is mounted on principal surface 91b (the second principal surface).

According to the above-described configuration, post-stage amplifier 11b is disposed on principal surface 91a of module board 91, and switch 54 is disposed on principal surface 91b of module board 91. In other words, post-stage amplifier 11b and switch 54 are arranged with module board 91 interposed therebetween. According to this configuration, it is possible to reduce the electric field coupling, the magnetic field coupling, or the electromagnetic field coupling between switch 54 disposed on the input side of transmission power amplifier 11 and an output line of post-stage amplifier 11b disposed on the output side of transmission power amplifier 11. For that reason, it is possible to inhibit transmission power amplifier 11 from oscillating as a result of formation of an unnecessary feedback loop that transfers a radio frequency signal between the input and output of transmission power amplifier 11. It is thus possible to reduce an unstable operation of transmission power amplifier 11.

In addition, in radio frequency module 1D according to the present working example, transmission power amplifier 11 and duplexers 61 and 62 are mounted on different principal surfaces.

As illustrated in FIG. 4B, a portion of line W11 (the first line) that connects post-stage amplifier 11b and switch 51 via matching circuit 31 is included in dielectric layer L4 (the first inner layer) which has a relatively large thickness. In addition, a portion of line W61 (the second line) that connects duplexer 61 and switch 51 is included in dielectric layer L5 (the second inner layer) which has a relatively large thickness. In addition, a portion of line W62 (the second line) that connects duplexer 62 and switch 51 is included in dielectric layer L4 (the first inner layer) which has a relatively large thickness.

In addition, ground electrode pattern 93G1 is included in dielectric layer L3 adjacent to dielectric layer L4, and ground electrode pattern 93G2 is included in dielectric layer L6 adjacent to dielectric layer L5. As illustrated in FIG. 4B, ground electrode patterns 93G1 and 93G2 are arranged such that the portions of line W11 and line W62 included in dielectric layer L4 and the portion of line W61 included in dielectric layer L5 are interposed therebetween. In addition, ground electrode patterns 93G1 and 93G2 overlap the portions of line W11 and line W62 included in dielectric layer L4 and line W61 included in dielectric layer L5 in a plan view of module board 91.

According to the above-described configuration, the parasitic capacitance of line W11, line W61, and line W62 is reduced, and thus it is possible to reduce the transfer losses of line W11, line W61, and line W62. As a result, it is possible to reduce the transfer loss of transmission signals output from transmission power amplifier 11.

It should be noted that it is desirable that the line width of the portion of line W11 included in dielectric layer L4 be less than or equal to the line width of each of portions of line W11 included in the surface layers that define principal surfaces 91a and 91b, and that the line length of the portion of line W11 included in dielectric layer L4 be greater than or equal to the line length of each of the portions of line W11 included in the surface layers that define principal surfaces 91a and 91b. In addition, it is desirable that the line width of the portion of line W62 included in dielectric layer L4 be less than or equal to the line width of each of portions of line W62 included in the surface layers that define principal surfaces 91a and 91b, and that the line length of the portion of line W62 included in dielectric layer L4 be greater than or equal to the line length of each of the portions of line W62 included in the surface layers that define principal surfaces 91a and 91b. In addition, it is desirable that the line width of the portion of line W61 included in dielectric layer L5 be less than or equal to the line width of each of portions of line W61 included in the surface layers that define principal surfaces 91a and 91b, and that the line length of the portion of line W61 included in dielectric layer L5 be greater than or equal to the line length of each of the portions of line W61 included in the surface layers that define principal surfaces 91a and 91b.

In addition, when the line length of each of the portions of line W11 included in the surface layers that define principal surfaces 91a and 91b is longer than the line length of the portion of line W11 included in dielectric layer L4, it is desirable that, in the dielectric layers adjacent to the surface layers, a ground electrode pattern be not included in a region immediately below the portion of line W11 included in the surface layers. In addition, it is desirable that line W61 and line W62 each have a configuration similar to or same as the configuration described above.

It should be noted that only one of the portion of line W61 that connects duplexer 61 and switch 51 and the portion of line W62 that connects duplexer 62 and switch 51 may be included in the inner layer that has a relatively large thickness. In this case, it is desirable that, of line W61 and line W62, a line along which a signal of a higher frequency passes be included in the inner layer that has a relatively large thickness.

According to the above-described configuration, it is possible to reduce the parasitic capacitance of, of line W61 and line W62, a line in which a large parasitic capacitance is possibly generated. As a result, it is possible to further effectively reduce the transfer losses of line W61 or line W62.

In addition, in radio frequency module 1D according to the present working example, switch 53 (the antenna switch) is disposed on principal surface 91a and duplexers 61 and 62 are disposed on principal surface 91b. As illustrated in FIG. 4A, a footprint of switch 53 at least partially overlaps a footprint of duplexers 61 or 62 in a plan view of module board 91.

According to the-above described configuration, it is possible to shorten the line that connects switch 53 and duplexers 61 and 62. As a result, it is possible to achieve reduction of the transfer loss and miniaturization of radio frequency module 1D.

7. Advantageous Effects, Etc.

As described above, radio frequency module 1A according to the present embodiment includes: module board 91 including principal surface 91a and principal surface 91b on opposite sides of module board 91; transmission input terminals 111 and 112; post-stage amplifier 11b configured to amplify a transmission signal input through transmission input terminal 111 or 112; and switch 54 configured to connect and disconnect transmission input terminals 111 and 112 and post-stage amplifier 11b. In radio frequency module 1A according to the present embodiment, post-stage amplifier 11b is disposed on principal surface 91a, and switch 54 is disposed on principal surface 91b.

According to the-above described configuration, post-stage amplifier 11b and switch 54 are arranged with module board 91 interposed therebetween. With this configuration, it is possible to reduce the electric field coupling, the magnetic field coupling, or the electromagnetic field coupling between switch 54 disposed on the input side of transmission power amplifier 11 and an output line of post-stage amplifier 11b disposed on the output side of transmission power amplifier 11. For that reason, it is possible to inhibit transmission power amplifier 11 from oscillating as a result of formation of an unnecessary feedback loop that transfers a radio frequency signal between the input and output of transmission power amplifier 11. It is thus possible to reduce an unstable operation of transmission power amplifier 11.

In addition, radio frequency module 1A may further include pre-stage amplifier 11a connected between an input terminal of post-stage amplifier 11b and switch 54.

In addition, pre-stage amplifier 11a may be disposed on principal surface 91a.

According to the-above described configuration, it is possible to reduce the electric field coupling, the magnetic field coupling, or the electromagnetic field coupling between switch 54 disposed on the input side of transmission power amplifier 11 and an output line of pre-stage amplifier 11a. For that reason, it is possible to inhibit pre-stage amplifier 11a from oscillating as a result of formation of an unnecessary feedback loop that transfers a radio frequency signal between the input and output of pre-stage amplifier 11a. It is thus possible to reduce an unstable operation of transmission power amplifier 11.

In addition, a footprint of pre-stage amplifier 11a may at least partially overlaps with a footprint of switch 54 in a plan view of module board 91.

According to the-above described configuration, it is possible to connect pre-stage amplifier 11a and switch 54 via a conductor that is formed in module board 91 along the direction perpendicular to principal surfaces 91a and 91b (the z-axis direction). It is thus possible to reduce the length of the line connecting pre-stage amplifier 11a and switch 54. As a result, it is possible to reduce transfer loss of transmission signals.

In addition, radio frequency module 1A may further include matching circuit 31 connected to an output terminal of post-stage amplifier 11b. In the above-described radio frequency module 1A, matching circuit 31 may include an inductor, and the inductor may be disposed on principal surface 91a.

According to the-above described configuration, the inductor of matching circuit 31 and switch 54 are arranged with module board 91 interposed therebetween. According to this configuration, it is possible to reduce the electric field coupling, the magnetic field coupling, or the electromagnetic field coupling between switch 54 disposed on the input side of transmission power amplifier 11 and the inductor of matching circuit 31 disposed on the output side of transmission power amplifier 11. For that reason, it is possible to further inhibit transmission power amplifier 11 from oscillating as a result of formation of an unnecessary feedback loop that transfers a radio frequency signal between the input and output of transmission power amplifier 11. It is thus possible to further reduce an unstable operation of transmission power amplifier 11.

In addition, radio frequency module 1A may further include external-connection terminal 150, and external-connection terminal 150 may be disposed on principal surface 91b.

In addition, radio frequency module 1A may further include antenna connection terminal 100 and reception low noise amplifier 21 configured to amplify a reception signal input through antenna connection terminal 100, and reception low noise amplifier 21 may be disposed on principal surface 91b.

According to the-above described configuration, transmission power amplifier 11 and reception low noise amplifier 21 are arranged with module board 91 interposed therebetween, and thus it is possible to improve the isolation between the transmission side and the reception side. In addition, of principal surfaces 91a and 91b, transmission power amplifier 11 which is difficult to reduce the height is not disposed on principal surface 91b that faces the motherboard, but reception low noise amplifier 21 which is easy to reduce the height is disposed on principal surface 91b, and thus it is possible to reduce the height of radio frequency module 1A as a whole. In addition, a plurality of external-connection terminals 150 that are applied as ground electrodes are disposed in the vicinity of reception low noise amplifier 21 that significantly affects the reception sensitivity of the reception circuit. As a result, it is possible to reduce deterioration of the reception sensitivity of the reception circuit.

In addition, radio frequency module 1D may further include: transmission filter 61T disposed on principal surface 91b and configured to pass a transmission signal output from post-stage amplifier 11b; and switch 51 disposed on principal surface 91b and configured to connect and disconnect transmission filter 61T and post-stage amplifier 11b. In radio frequency module 1D, module board 91 may include a plurality of dielectric layers L1 to L7 that are stacked, at least a portion of line W11 that connects post-stage amplifier 11b and switch 51 may be included in dielectric layer L4 among the plurality of dielectric layers L1 to L7 other than surface layers that define principal surface 91a and principal surface 91b, at least a portion of line 61 that connects transmission filter 61T and switch 51 may be included in dielectric layer L5 among the plurality of dielectric layers L1 to L7 other than the surface layers, dielectric layer L4 and dielectric layer L5 may each be thicker than any of the plurality of dielectric layers L1 to L7 other than dielectric layer L4 and dielectric layer L5, ground electrode patterns 93G1 and 93G2 may be included respectively in dielectric layer L3 adjacent to dielectric layer L4 and dielectric layer L6 adjacent to dielectric layer L5 among the plurality of dielectric layers L1 to L7, and the at least the portion of line W11 and the at least the portion of line W61 may overlap ground electrode patterns 93G1 and 93G2 in a plan view of module board 91.

According to the above-described configuration, the parasitic capacitance of line W11 and line W61 is reduced, and thus it is possible to reduce the transfer losses of line W11 and line W61. As a result, it is possible to reduce the transfer loss of transmission signals output from transmission power amplifier 11.

In addition, radio frequency module 1D may further include switch 53 disposed on principal surface 91a and connected to an output terminal of transmission filter 61T. In radio frequency module 1D, a footprint of switch 53 may at least partially overlaps with a footprint of transmission filter 61T in a plan view of module board 91.

According to the-above described configuration, it is possible to shorten the line that connects switch 53 and transmission filter 61T. As a result, it is possible to achieve reduction of the transfer loss and miniaturization of radio frequency module 1D.

In addition, in radio frequency module 1B according to the present variation, post-stage amplifier 12b may be configured to amplify a transmission signal of communication band A input through transmission input terminal 110. In radio frequency module 1B according to the present variation, post-stage amplifier 12b may be disposed on principal surface 91b, and post-stage amplifier 13b and switch 55 may be disposed on principal surface 91a.

According to the-above described configuration, post-stage amplifier 12b and switch 55 are arranged with module board 91 interposed therebetween. With this configuration, it is possible to reduce the electric field coupling, the magnetic field coupling, or the electromagnetic field coupling between switch 55 disposed on the input side of transmission power amplifier 12 and an output line of post-stage amplifier 12b disposed on the output side of transmission power amplifier 12. For that reason, it is possible to inhibit transmission power amplifier 12 from oscillating as a result of formation of an unnecessary feedback loop that transfers a radio frequency signal between the input and output of transmission power amplifier 12. It is thus possible to reduce an unstable operation of transmission power amplifier 12. In addition, post-stage amplifier 12b that amplifies a transmission signal of communication band A and post-stage amplifier 13b that amplifies a transmission signal of communication band B are arranged with module board 91 interposed therebetween, and thus it is possible to improve the isolation between the different communication bands.

In addition, it is desirable that a footprint of post-stage amplifier 12b does not overlap with a footprint of post-stage amplifier 13b in a plan view of module board 91.

According to the above-described configuration, it is possible to ensure a large distance between post-stage amplifier 12*b* and post-stage amplifier 13*b*. As a result, it is possible to further improve the isolation between the different communication bands.

In addition, radio frequency module 1B may further include external-connection terminal 150. In radio frequency module 1B, external-connection terminal 150 may be disposed on principal surface 91*b*.

In addition, radio frequency module 1B may further include: antenna connection terminal 100; and reception low noise amplifier 21 configured to amplify a reception signal input through antenna connection terminal 100. In radio frequency module 1B, reception low noise amplifier 21 may be disposed on principal surface 91*b*.

According to the-above described configuration, transmission power amplifier 13 and reception low noise amplifier 21 are arranged with module board 91 interposed therebetween, and thus it is possible to improve the isolation between the transmission side and the reception side. In addition, a plurality of external-connection terminals 150 that are applied as ground electrodes are disposed in the vicinity of reception low noise amplifier 21 that significantly affects the reception sensitivity of the reception circuit. As a result, it is possible to reduce deterioration of the reception sensitivity of the reception circuit.

In addition, communication device 5A includes: antenna 2; RFIC 3 configured to process radio frequency signals transmitted and received by antenna 2; and radio frequency module 1A configured to transfer the radio frequency signals between antenna 2 and RFIC 3.

It is thus possible to reduce an unstable operation of transmission power amplifier 11.

Other Embodiments, Etc.

Although the radio frequency module and the communication device according to the embodiment of the present disclosure have been described above based on the embodiment, variations, and working examples, the radio frequency module and the communication device according to the present disclosure are not limited to the foregoing embodiment, variations, and working examples. The present disclosure also encompasses other embodiments achieved by combining arbitrary structural components in the above-described embodiment, variations, and working examples, variations resulting from various modifications to the above-described embodiment, variations, and working examples that may be conceived by those skilled in the art without departing from the essence of the present disclosure, and various devices that include the above-described radio frequency module and the above-described communication device.

For example, in the radio frequency module and the communication device according to the foregoing embodiment, variations, and working examples, another circuit element and line, for example, may be inserted in a path connecting circuit elements and a signal path which are disclosed in the drawings.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable widely to communication apparatuses such as mobile phones as a radio frequency module disposed in a multiband-compatible front-end unit.

The invention claimed is:

1. A radio frequency module, comprising:
a module board including a first principal surface and a second principal surface opposite to the first principal surface;
a transmission input terminal;
a first transmission amplifier disposed on the first principal surface and configured to amplify a transmission signal input through the transmission input terminal;
a first switch disposed on the second principal surface and configured to connect and disconnect the transmission input terminal and the first transmission amplifier;
a transmission filter disposed on the second principal surface and configured to pass a transmission signal output from the first transmission amplifier; and
a second switch disposed on the second principal surface and configured to connect and disconnect the transmission filter and the first transmission amplifier, wherein
the module board further includes a plurality of dielectric layers that are stacked, and
at least a portion of a first line that connects the first transmission amplifier and the second switch is included in a first inner layer among the plurality of dielectric layers other than surface layers that define the first principal surface and the second principal surface.

2. The radio frequency module of claim 1, further comprising:
a second transmission amplifier connected between an input terminal of the first transmission amplifier and the first switch.

3. The radio frequency module of claim 2, wherein
the second transmission amplifier is disposed on the first principal surface and connected between the input terminal of the first transmission amplifier and the first switch.

4. The radio frequency module of claim 3, wherein
the second transmission amplifier and the first switch at least partially overlap in a plan view of the module board.

5. The radio frequency module of claim 1, further comprising:
an impedance matching circuit connected to an output terminal of the first transmission amplifier and an input terminal of the second switch.

6. The radio frequency module of claim 5, wherein
the impedance matching circuit includes an inductor disposed on the first principal surface.

7. The radio frequency module of claim 6, further comprising:
an antenna connection terminal; and
a reception amplifier disposed on the second principal surface and configured to amplify a reception signal input through the antenna connection terminal.

8. The radio frequency module of claim 1, further comprising:
one or more external-connection terminals disposed on the second principal surface.

9. The radio frequency module of claim 1, wherein
at least a portion of a second line that connects the transmission filter and the second switch is included in a second inner layer among the plurality of dielectric layers other than the surface layers.

10. The radio frequency module of claim 9, wherein the first inner layer and the second inner layer are each thicker than any of the plurality of dielectric layers other than the first inner layer and the second inner layer.

11. The radio frequency module of claim 10, wherein ground electrode patterns are included respectively in a dielectric layer adjacent to the first inner layer and in a dielectric layer adjacent to the second inner layer among the plurality of dielectric layers.

12. The radio frequency module of claim 11, wherein the at least the portion of the first line and the at least the portion of the second line overlap the ground electrode patterns in a plan view of the module board.

13. The radio frequency module of claim 1, further comprising:
an antenna switch disposed on the first principal surface and connected to an output terminal of the transmission filter, wherein
a footprint of the antenna switch at least partially overlaps with a footprint of the transmission filter in a plan view of the module board.

14. A radio frequency module, comprising:
a module board including a first principal surface and a second principal surface opposite to the first principal surface;
a transmission input terminal;
a first transmission amplifier disposed on the first principal surface and configured to amplify a transmission signal of a first communication band input through the transmission input terminal;
a second transmission amplifier disposed on the second principal surface and configured to amplify a transmission signal of a second communication band input through the transmission input terminal;
a switch disposed on the first principal surface and configured to connect and disconnect the transmission input terminal and the first transmission amplifier and the second transmission amplifier, wherein
the module board further includes a plurality of dielectric layers that are stacked, and
at least a portion of a first line that connects the second transmission amplifier and the switch is included in a first inner layer among the plurality of dielectric layers other than surface layers that define the first principal surface and the second principal surface.

15. The radio frequency module of claim 14, wherein a footprint of the first transmission amplifier does not overlap with a footprint of the second transmission amplifier in a plan view of the module board.

16. The radio frequency module of claim 14, further comprising:
one or more external-connection terminals disposed on the second principal surface.

17. The radio frequency module of claim 16, further comprising:
an antenna connection terminal; and
a reception amplifier disposed on the second principal surface and configured to amplify a reception signal input through the antenna connection terminal.

18. A communication device, comprising:
an antenna;
a radio frequency (RF) signal processing circuit configured to process radio frequency signals transmitted and received by the antenna; and
a radio frequency module configured to transfer the radio frequency signals between the antenna and the RF signal processing circuit, wherein
the radio frequency module comprises
a module board including a first principal surface and a second principal surface opposite to the first principal surface;
a transmission input terminal;
a transmission amplifier disposed on the first principal surface and configured to amplify a transmission signal input through the transmission input terminal;
a first switch disposed on the second principal surface and configured to connect and disconnect the transmission input terminal and the transmission amplifier;
a transmission filter disposed on the second principal surface and configured to pass a transmission signal output from the transmission amplifier; and
a second switch disposed on the second principal surface and configured to connect and disconnect the transmission filter and the transmission amplifier, wherein
the module board further includes a plurality of dielectric layers that are stacked, and
at least a portion of a first line that connects the transmission amplifier and the second switch is included in an inner layer among the plurality of dielectric layers other than surface layers that define the first principal surface and the second principal surface.

* * * * *